Jan. 7, 1964  C. W. COCHRAN  3,116,526
FASTENING DEVICE
Filed Dec. 23, 1959
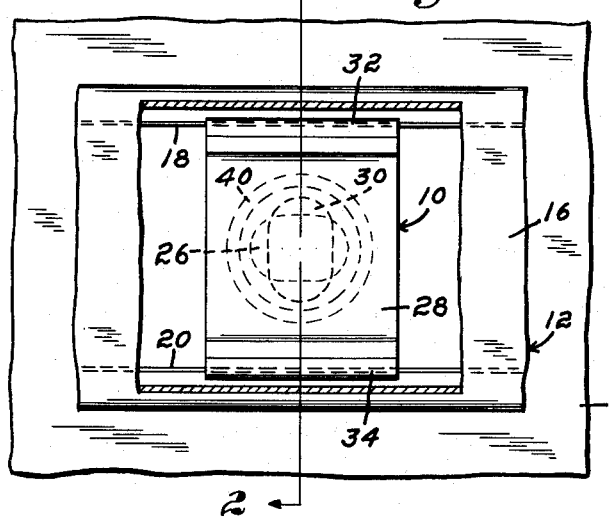
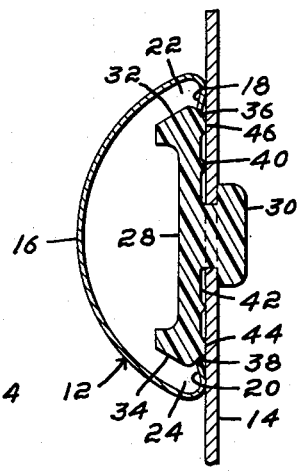
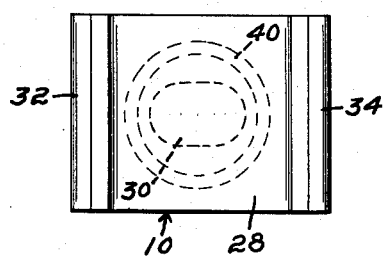
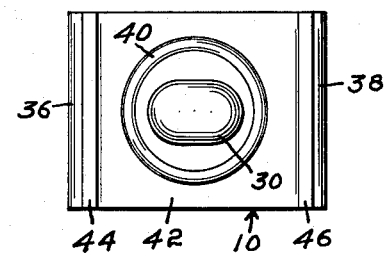
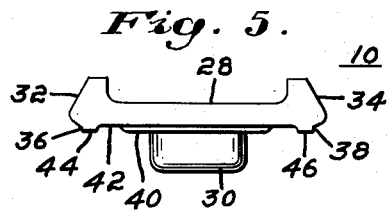
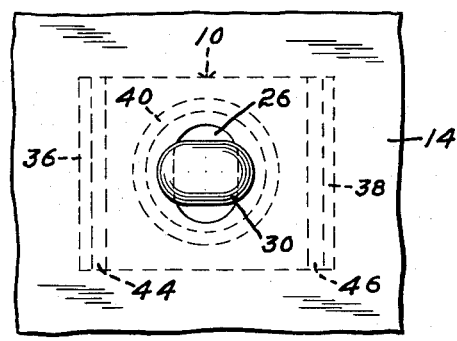
Inventor:
Clarence W. Cochran,
by James B. Tiffany Jr.
Atty.

United States Patent Office 3,116,526
Patented Jan. 7, 1964

3,116,526
FASTENING DEVICE
Clarence W. Cochran, Belmont, Mass., assignor to United-Carr Fastener Corporation, Cambridge, Mass., a corporation of Delaware
Filed Dec. 23, 1959, Ser. No. 861,606
1 Claim. (Cl. 24—73)

This invention relates to fastening devices and in particular to a fastener for attaching moldings or the like to a support.

The important object of this invention is to provide a one piece molding fastener which may be simply and economically molded or extruded from a plastic material.

A further object of the invention is to provide a resilient molding fastener which may be utilized in blind applications.

Another object of the invention is to provide a molding fastener having self-sealing features integral therewith preventing the ingress of water.

Other objects of the invention will, in part be obvious, and will, in part, appear hereinafter.

In the drawing:

FIG. 1 is a top plan view of the fastener assembled to a support, partly in section with a molding strip snapped thereon;

FIG. 2 is a view in section taken on line 2—2 of FIG. 1;

FIG. 3 is a top plan view of the molding fastener;

FIG. 4 is a bottom plan view of the fastener;

FIG. 5 is a view in side elevation of the device; and

FIG. 6 is a bottom plan view of the molding fastener assembled to a support.

Referring to the drawing, there is illustrated a molding fastener 10 adapted to secure a molding 12 to a support 14. The molding 12 is of the conventional type having a rounded body portion 16 and inturned edges 18 and 20 forming opposing recesses 22 and 24. The support 12 is usually a portion of the automotive body, but in some instances, is a superposed plate having an oval aperture 26 therethrough.

The fastener 10 is molded or formed in one piece from a suitable plastic material, such as a polyamide or the like, and consists of a head portion 28 and a shank 30 adapted for rotation within the oval aperture 26 of the support 14. The head portion 28 is of generally rectangular form having upwardly extending distal end portions 32 and 34. Undercut portions 36 and 38 are formed on the distal end portions for a purpose to be described hereinafter. A sealing member 40 is molded integral with and extends downwardly from the undersurface 42 of the head portion, so as to be concentric to the axis of the shank member 30. The shank 30 as illustrated in FIG. 4 is of an oval configuration permitting initial entry of the fastener through the oval aperture 26 of the support.

The assembly of the fastener 10 with the support 12 is accomplished by inserting the oval shank 30 through the apertured support and rotation of approximately 90° will cause the wall at the edges of the aperture to cut into the shank to retain it securely in assembly. As an aid to rotation, bearing surfaces 44 and 46 are formed integral with the undersurface of the head portion 28 and spaced inwardly from the undercut portions 36 and 38.

The molding 12 is then clipped over the fastener 10 so that the inturned edges 18 and 20 cooperate with the undercut portions 36 and 38 of the fastener 10. As the fastener 10 is rotated relative to the support, the sealing member 40 bears against the surface of the support and will effectively seal out moisture from the interior of the body.

Since certain other obvious modifications may be made in this device without departing from the scope of the invention, it is intended that all matter contained herein be interpreted in an illustrative and not in a limiting sense.

I claim:

A fastening device of the rotary attachable type having a head portion and a shank portion, the said shank portion being formed of molded shearable plastic material and being of a non-circular cross section and having a continuous outer peripheral wall originally free of indentations and projections whereby the said shank portion may be inserted in a non-circular aperture in a support and rotated a predetermined number of degrees so that the walls surrounding the openings in the support will form grooves in the peripheral wall of the shank and lock the fastening device to the support against accidental separation, the thickness of the support governing the dimensions of the grooves formed in the said shank portion.

References Cited in the file of this patent

UNITED STATES PATENTS

| 2,318,840 | Del Camp | May 11, 1943 |
| 2,826,388 | Janos et al. | Mar. 11, 1958 |

FOREIGN PATENTS

| 1,176,696 | France | Nov. 24, 1958 |
| 745,788 | Great Britain | Feb. 29, 1956 |
| 816,359 | Great Britain | July 8, 1959 |